United States Patent
Thornton et al.

(10) Patent No.: US 11,586,737 B2
(45) Date of Patent: *Feb. 21, 2023

(54) DETECTING MALICIOUS SOFTWARE USING SENSORS

(71) Applicant: Ironwood Cyber Inc., Dallas, TX (US)

(72) Inventors: Mitchell Thornton, Dallas, TX (US); Michael Taylor, Dallas, TX (US); Kaitlin Smith, Dallas, TX (US)

(73) Assignee: IRONWOOD CYBER INC., Dallas, TX (US)

( * ) Notice: Subject to any disclaimer, the term of this patent is extended or adjusted under 35 U.S.C. 154(b) by 50 days.

This patent is subject to a terminal disclaimer.

(21) Appl. No.: 17/350,824

(22) Filed: Jun. 17, 2021

(65) Prior Publication Data

US 2021/0312049 A1  Oct. 7, 2021

Related U.S. Application Data

(63) Continuation of application No. 15/812,663, filed on Nov. 14, 2017, now Pat. No. 11,042,638.

(51) Int. Cl.

| | |
|---|---|
| *G06F 21/56* | (2013.01) |
| *G06F 21/53* | (2013.01) |
| *G06N 5/022* | (2023.01) |
| *G06F 21/57* | (2013.01) |
| *G06N 20/00* | (2019.01) |
| *G06F 21/50* | (2013.01) |

(52) U.S. Cl.
CPC .............. *G06F 21/568* (2013.01); *G06F 21/50* (2013.01); *G06F 21/53* (2013.01); *G06F 21/56* (2013.01); *G06F 21/566* (2013.01); *G06F 21/567* (2013.01); *G06F 21/57* (2013.01); *G06N 5/022* (2013.01); *G06N 20/00* (2019.01); *G06F 2221/034* (2013.01)

(58) Field of Classification Search
CPC .......... G06F 21/50; G06F 21/53; G06F 21/56; G06F 21/556
See application file for complete search history.

(56) References Cited

U.S. PATENT DOCUMENTS

| | | | |
|---|---|---|---|
| 9,565,202 B1 * | 2/2017 | Kindlund | H04L 63/145 |
| 2015/0301570 A1 * | 10/2015 | Fine | G06F 21/76 |
| | | | 726/22 |

(Continued)

OTHER PUBLICATIONS

Abrams [ online ], "CryptoLocker Ransomware Information Guide and FAQ," BleepingComputer.com: Vims, Spyware, Malware, & PUP Removal Guides, Oct. 14, 2013, [retrieved on Aug. 29, 2019], retrieved from: URL https ://www.bleepingcomputer.com/vims-removal/cryptolocker-ransomware-inf formation, 32 pages.

(Continued)

*Primary Examiner* — Daniel B Potratz
(74) *Attorney, Agent, or Firm* — Wilson Sonsini Goodrich & Rosati

(57) ABSTRACT

In some implementations, a method includes retrieving data from multiple sensors in a computing device, and the multiple sensors comprise different types of sensors. The sensor data is analyzed based on a predictive model, and the predictive model is trained to detect malware. Initiation of malware is determined based on the analysis. In response to the determination, the malware is terminated.

52 Claims, 3 Drawing Sheets

(56) References Cited

U.S. PATENT DOCUMENTS

| | | | | |
|---|---|---|---|---|
| 2016/0253498 | A1* | 9/2016 | Valencia | G06N 20/00 726/23 |
| 2016/0378988 | A1 | 12/2016 | Bhashkar et al. | |
| 2017/0140156 | A1 | 5/2017 | Gu et al. | |
| 2017/0235951 | A1* | 8/2017 | Harrison | G06F 21/561 726/24 |
| 2018/0007074 | A1 | 1/2018 | Kune et al. | |
| 2018/0278647 | A1* | 9/2018 | Gabaev | H04L 63/1425 |
| 2019/0012459 | A1* | 1/2019 | Choi | G06F 21/568 |
| 2019/0087572 | A1 | 3/2019 | Ellam et al. | |
| 2019/0108332 | A1* | 4/2019 | Glew | G06F 21/554 |

OTHER PUBLICATIONS

Alharbi et al., "Demographic Group Classification of Smart Device Users," 2015 IEEE 14th International Conference on Machine Learning and Applications (ICMLA), IEEE, Dec. 2015, 6 pages.

Bonderud [online], "CryPy Ransomware Slithers Onto PCs With Unique, Python-Based Encryption," SecurityIntelligence.com: News, Oct. 19, 2016, [ retrieved on Aug. 29, 2019], retrieved from: URL https://cyber.aspida.org/crypy-ransomware-slithers-onto-pcs-unique-python-based-encryption/, 2 pages.

Demme et al., "On the Feasibility of Online Malware Detection with Performance Counters," ACM SIGARCH Computer Architecture News. vol. 41, No. 3, Jun. 2013, 12 pages.

Encyclopedia by Kaspersky Lab [online], "History of Malicious Programs,"Kaspersky Lab Encyclopedia, Knowledge Base: Detected Objects, [retrieved on Oct. 12, 2021], retrieved from: URLhttps://encyclopedia.kaspersky.com/knowledge/history-of-malicious-programs/, 5 pages.

Hosmer et al., "Chapter 1: Introduction to the Logistic Regression Model," in Wiley Series in Probability and Statistics: Annlied Logistic Regression, 3rd ed. Wiley, 2013, 33 pages.

Korolov [online], "Ransomware took in $1 billion in 2016—improved defenses may not be enough to stem the tide," CSO from IDF: Security, Jan. 5, 2017, [retrieved on Aug. 29, 2019], retrieved from: URLhttps://www.csoonline.com/article/3154714/ransomware-took-in-l-billion-in-2016-improved-defenses-may-not-be-enough-to-stem-the-tide.html, 3 pages.

Litzenberger [online], "Package: Crypto Python Cryptography Toolkit," Dlitz.net, [retrieved on Aug. 29, 2019], retrieved from: URLhttps://www.dlitz.net/software/pycrypto/api/current/, 1 page.

Marketsandmarkets.com [online], "Ransomware Protection Market by Solution, Service, Application, Deployment, Organization Size, Vertical, Region—Global Forecast to 2021," Ransomware Protection Market, Jan. 2017, [retrieved on Apr. 19, 2019], retrieved from: URLhttps://www.marketsandmarkets.com/Market-Reports/ransomware-protection-market-84263725.html, 7 pages.

Mehmood, "Enterprise Survival Guide for Ransomware Attacks." Technical Report, The SANS Institute, 2015, 29 pages.

Mell et al., "Guide of Malware Incident Prevention and Handling," Recommendations of the National Institute of Standards and Technology (NIST), Special Publication 800-83, 2005, 101 pages.

[No Author Listed], "Announcing the Advanced Encryption Standard (AES)," Federal Information: Processing Standards Publication 197, United States National Institute of Standards and Technology (NIST), Nov. 26, 2001, 51 pages.

Oehman et al., "LINEBACKER: LINE-speed Bio-inspired Analysis and Characterization for Event Recognition," 2016 IEEE Security and Privacy Workshops (SPW), May 2016, 8 pages.

O'Gorman et al., "Ransomware: A Growing Menace." Technical Report, Symantec Corporation, 2012, 16 pages.

Scaife et al., "CryptoLock (and Drop It): Stopping Ransomware Attacks on User Data," Proceedings from IEEE International Conference on Distributed Computing Systems, Jun. 2016, 10 pages.

Seitz, "Black Hat Python: Python Programming for Hackers and Pentesters," No Starch Press, Inc, 2015,.

Tanase [online], "All about Malware and Information Privacy," TechAcute.com, Aug. 31, 2014, [retrieved on Apr. 19, 2019], retrieved from: URLhttps://techacute.com/malware-information-privacy/, 8 pages.

Tang et al., "Unsupervised Anomaly-based Malware Detection using Hardware Features," 17th International Symposium on Research in Attacks, Intrusions and Defenses, Sep. 2014, 21 pages.

Wyke et al., "The Current State of Ransomware," Technical Report, SophosLabs, 2015, 61 pages.

Zetter [online], "What is Ransomware? A Guide to the Global Cyberattack's Scary Method," Wired.com: Security, May 14, 2017, [retrieved on Apr. 19, 2019], retrieved from: URLhttps://www.wired.com/2017 /05/hacker-lexicon-guide-ransomware-scary-hack-that's-rise/, 7 pages.

* cited by examiner

DETECTING MALICIOUS SOFTWARE USING SENSORS

CROSS-REFERENCE TO RELATED APPLICATIONS

This application is a Continuation of U.S. patent application Ser. No. 15/812,663, filed Nov. 14, 2017, which is incorporated herein by reference in its entirety.

BACKGROUND

Effective defense against a ransomware attack is typically a multi-tiered or layered approach. Detection of the malware when downloading to the victim computer is an outer defense, and if possible, can prevent the ransomware from ever entering the system. This defense attempts to prevent an attack vector from penetrating a victims host computer. Packet signature monitoring via an intrusion detection system (IDS) or file signature monitoring via a local antivirus software program can provide this capability, but only if these methods are capable of recognizing the malware through knowledge of the data signatures. While this defense is a desirable, it is notoriously difficult to prevent infection with previously unknown ransomware versions, or so-called zero-day attacks.

In the case of zero-day ransomware, data signatures and other corresponding characteristics are unknown by definition. Furthermore, the increasing presence of polymorphic malware is causing signature-based approaches to become less effective than they once were.

SUMMARY

In some implementations, a method includes retrieving data from multiple sensors in a computing device, and the multiple sensors comprise different types of sensors. The sensor data is analyzed based on a predictive model, and the predictive model is trained to detect malware. Initiation of malware is determined based on the analysis. In response to the determination, the malware is terminated.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

The present disclosure is directed to a system and method for detecting ransomware in an infected host (e.g., computer, mobile device) during the initiation of its payload execution. In these instances, data streams from on-board sensors in the host can be monitored and ransomware infections can be detecting using these data streams and predefined criteria. In this sense, a physical side channel can be used where the victim's files are not directly monitored. The behavior of the victim machine is monitored and onboard sensor-provided data is used as side-channel information that can indicate when an encryption operation is occurring. In other words, encryption detection depends upon the use of small yet distinguishable changes in the physical state of a system as reported through onboard sensor-provided data. In some implementations, monitoring can be accomplished through a background process that is loaded at boot time and thus continuously monitors the system for suspicious behavior. Once this suspicious behavior is detected, the user can be alerted and the suspicious processes can be suspended. The central difference between this approach and other previous approaches is that this approach uses secondary effects to detect the presence of malware rather than a direct effect, such as measuring increases in file entropy.

In some implementations, a feature vector can be formulated consisting of various sensor outputs that is coupled with a detection criterion for the binary states of ransomware present versus normal operation. In this instances, previously unknown or zero-day versions of ransomware are vulnerable since no a priori knowledge of the malware, such as a data signature, is required. Experimental results from a system which underwent testing with 16 different test configurations comprised of different simulated system loads unknown to the model and different AES encryption methods used during a simulated ransomware attack showed an average true positive prediction rate of 98.82% and an average false positive prediction rate of 1.57% for predictions made once every second about the state of the system under test.

Figure 1:
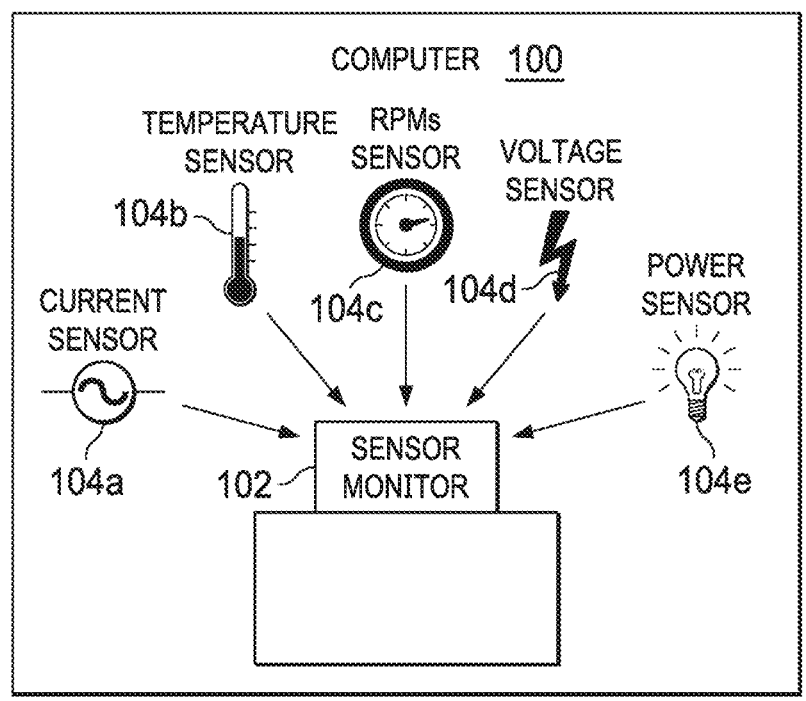
FIG. 1 is an example computing device including sensors for detecting ransomware.

FIG. 1 illustrates an example computing device 100 for detecting ransom where in accordance with one or more implementations of the present disclosure. In some implementations, the computing device 100 uses sensor data to detect initiation of encryption of data. In the illustrated, the computing device 100 includes a sensor-monitoring module 102 communicably coupled to sensors 104a-e to detect operating conditions of the device 100. As illustrated, the sensors 104a-e include a current sensor 104a, a temperature sensor 104b, RPM sensor 104c, a voltage sensor 104d, and a power sensor 104e. The computing device 100 may include the same, some, or different sensors to detect malware (e.g., ransomware) without departing from the scope of the disclosure.

In general, the computing device 100 includes sensors 104a-e to monitor the state of internal hardware components. These sensors 104a-e can, in some implementations, continuously or periodically gather and supply sensor data that is communicated with other devices and subsystems to substantially maintain the device 100 within specific operating specifications. If sensor data reveals that a device component is approaching a boundary for a recommended value of an operational specification, safety mechanisms can be engaged to correct the internal environment and prevent or otherwise reduce malfunctions. For example, when the data from the temperature sensor 104b of, for example, a computer's central processing unit (CPU) begins to increase, a signal can be sent to the CPU cooling fan. This signal causes the fan to either become active or to increase the fan speed in order to cool the CPU. Additionally, the sensors 104a-e can provide input to other subsystems such as internal power management units, PMUs, to conserve power usage.

Typically, computing-device components are frequently designed to be compact in size through the use of transistors with feature sizing often in the nanometer scale. As a direct result, whenever computations become more complex, more stress in placed on the components. This increased stress occurs because a large number of transistors are frequently switching in a circuit that correspondingly cause an increase in dynamic power consumption and, in turn, more heat dissipation especially during heavy computational activity. Thus, monitoring the side channels of the computing device 100 with the embedded sensors 104a-e that measure operating conditions such as temperature, power consumption, and battery voltage levels can indicate the type of processing that is underway on a computer at a given time. As a result, monitoring a computer's side channels through periodic observations of sensor output data can, in some implementations, indicate when a resource-heavy task, such as encryption, is occurring. Since ransomware utilizes encryption in its payload to deny its victims access to their files, trends to emerge in regard to how a computer behaves while under ransomware attack based on analyzing data from a computer's side channel sensor data.

Conventional computers are comprised of the same set of basic internal devices to enable their operation. However, manufacturers may choose to use different and/or unique sets of components for their various computer models. Due to this variation among different product models, corresponding differences among the readings of the internal onboard sensors can occur when they are queried. In the illustrated implementation, the sensor-monitoring module 102 can include any software, hardware, and/or firmware configured to access sensor data (e.g., main memory power usage). For example, the sensor-monitoring module 102 can be accessed sensor data via the command line and/or through calls to the operating system and interpret the onboard sensor data. During experimentation, the Hardware Monitor and the Open Hardware Monitor applications were used to provide information from systems running Apple's OSX® and Microsoft's Windows® operating systems. As an example of large number of available on-board sensors, a list of the 59 sensors and their readings from an Apple Macbook® is provided below in Table 1.

TABLE 1

APPLE MACBOOK INTERNAL SENSORS AND READINGS

| Apple Macbook Senser | Value |
| --- | --- |
| SMART Disk APPLE SSD SD0128F (135251405113) [TEMPERATURE]: | 136.4 F. |
| SMC AIR INLET [TEMPERATURE]: | 102.2 F. |
| SMC BATTERY [TEMPERATURE]: | 87.8 F. |
| SMC BATTERY CHARGER PROXIMITY [TEMPERATURE]: | 111.2 F. |
| SMC BATTERY POSITION 2 [TEMPERATURE]: | 87.8 F. |
| SMC BATTERY POSITION 3 [TEMPERATURE]: | 87.8 F. |
| SMC CAMERA PROXIMITY [TEMPERATURE]: | 113 F. |
| SMC CHARGER PROXIMITY TEMPERATURE [TEMPERATURE]: | 100.4 F. |

TABLE 1-continued

APPLE MACBOOK INTERNAL SENSORS AND READINGS

| Apple Macbook Senser | Value |
| --- | --- |
| SMC CPU A PROXIMITY [TEMPERATURE]: | 120.2 F. |
| SMC LEFT PALM REST [TEMPERATURE]: | 87.8 F. |
| SMC MAIN HEAT SINK 2 [TEMPERATURE]: | 93.2 F. |
| SMC MAIN LOGIC BOARD [TEMPERATURE]: | 96.8 F. |
| SMC PLATFORM CONTROLLER HUB CHIP TEMPERATURE [TEMPERATURE]: | 129.2 F. |
| SMC SSD BAY [TEMPERATURE]: | 98.6 F. |
| SMC SSD TEMPERATURE A [TEMPERATURE]: | 138.2 F. |
| SMC SSD TEMPERATURE B [TEMPERATURE]: | 120.2 F. |
| SMC WLAN CARD [TEMPERATURE]: | 98.6 F. |
| Smart Battery bq20z451 (1) [TEMPERATURE]: | 82.4 F. |
| Battery 1 Cell 1 [VOLTAGE]: | 3.69299 V |
| Battery 1 Cell 2 [VOLTAGE]: | 3.69398 V |
| Battery 1 Voltage [VOLTAGE]: | 7.38699 V |
| SMC CPU CORE [VOLTAGE]: | 166211 V |
| SMC CPU SUPPLY 1 [VOLTAGE]: | 1.05176 V |
| SMC DC INPUT [VOLTAGE]: | 0 V |
| SMC POWER SUPPLY/BATTERY [VOLTAGE]: | 7.16016 V |
| SMC SSD SUPPLY [VOLTAGE]: | 3.29883 V |
| SMC WLAN CARD [VOLTAGE]: | 3.29883 V |
| Battery 1 Current [CURRENT]: | 1.45599 A |
| SMC 5 V S0 LINE [CURRENT]: | 0.0498047 A |
| SMC BACKLIGHT [CURRENT]: | 0.00292969 A |
| SMC MAIN HEAT SINK 2 [TEMPERATURE]: | 93.2 F. |
| SMC MAIN LOGIC BOARD [TEMPERATURE]: | 96.8 F. |
| SMC PLATFORM CONTROLLER HUB CHIP TEMPERATURE [TEMPERATURE]: | 129.2 F. |
| SMC SSD BAY [TEMPERATURE]: | 98.6 F. |
| SMC SSD TEMPERATURE A [TEMPERATURE]: | 138.2 F. |
| SMC SSD TEMPERATURE B [TEMPERATURE]: | 120.2 F. |
| SMC WLAN CARD [TEMPERATURE]: | 98.6 F. |
| Smart Battery bq20z451 (1) [TEMPERATURE]: | 82.4 F. |
| Battery 1 Cell 1 [VOLTAGE]: | 3.69299 V |
| Battery 1 Cell 2 [VOLTAGE]: | 3.69398 V |
| Battery 1 Voltage [VOLTAGE]: | 7.38699 V |
| SMC CPU CORE [VOLTAGE]: | 1.66211 V |
| SMC CPU SUPPLY 1 [VOLTAGE]: | 1.05176 V |
| SMC DC INPUT [VOLTAGE]: | 0 V |
| SMC POWER SUPPLY/BATTERY [VOLTAGE]: | 7.16016 V |
| SMC SSD SUPPLY [VOLTAGE]: | 3.29883 V |
| SMC WLAN CARD [VOLTAGE]: | 3.29883 V |
| Battery 1 Current [CURRENT]: | 1.45599 A |
| SMC 5 V S0 LINE [CURRENT]: | 0.0498047 A |
| SMC BACKLIGHT [CURRENT]: | 0.00292969 A |
| SMC BATTERY CURRENT [CURRENT]: | 0.78125 A |
| SMC CPU CORE [CURRENT]: | 0.566406 A |
| SMC CPU HIGH SIDE [CURRENT]: | 0.241211 A |
| SMC CPU SUPPLY 1 [CURRENT]: | 0.0107422 A |
| SMC CPU/VRM SUPPLY 2 [CURRENT]: | 0 A |
| SMC DC INPUT [CURRENT]: | 0.00195312 A |
| SMC DDR3 MEMORY 1.35 V LINE [CURRENT]: | 0.881836 A |
| SMC DDR3 MEMORY S3 LINE [CURRENT]: | 0.0771484 A |
| SMC DISCRETE BATTERY [CURRENT]: | 0.738281 A |
| SMC LCD PANEL [CURRENT]: | 0.000976562 A |
| SMC POWER SUPPLY/BATTERY [CURRENT]: | 0.770508 A |
| SMC SSD SUPPLY [CURRENT]: | 0.0771484 A |
| SMC WLAN CARD [CURRENT]: | 0.0107422 A |
| SMC 5 V S0 LINE [POWER]: | 0.164062 W |
| SMC BACKLIGHT [POWER]: | 0.015625 W |
| SMC CPU CORE [POWER]: | 0.964844 W |
| SMC CPU HIGH SIDE [POWER]: | 1.72266 W |
| SMC CPU SUPPLY 1 [POWER]: | 0.0078125 W |
| SMC CPU/VRM SUPPLY 2 [POWER]: | 0 W |
| SMC DDR3 MEMORY 1.35 V LINE [POWER]: | 1.05469 W |
| SMC DDR3 MEMORY S3 LINE [POWER]: | 0.0898438 W |
| SMC LCD PANEL [POWER]: | 0 W |
| SMC POWER SUPPLY/BATTERY [POWER]: | 5.51172 W |
| SMC SSD SUPPLY [POWER]: | 0.25 W |
| SMC WLAN CARD [POWER]: | 0.0351562 W |
| Battery 1 Current Capacity [CAPACITY]: | 503 mAh |
| Battery 1 Total Capacity [CAPACITY]: | 6559 mAh |
| SMC FAN Exhaust [RPMS]: | 1192 RPM |
| SMC AMBIENT LIGHT 1 [LIGHT]: | 70 |

In some implementations, the sensor-monitoring module 102 can determine prediction models using Machine Learning (ML) techniques. In these instances, the sensor-monitoring module 102 trains models using a large amount of data gathered and processed from an experimental environment. The sensor-monitoring module 102 can use the sensor data, such as that provided in Table 1, to form a feature vector that differentiates between the binary machine states of "normal operation" versus "ransomware payload execution" (i.e., unauthorized encryption activity). Instead of relying one type of sensor data, the feature vector can combine multiple types of sensor data. In response to the sensor-data feature vector indicating a specific state of encryption, the sensor-monitoring module 102 can issue alerts and suspend the corresponding encryption processes.

In some instances, the sensor-monitoring module 102 can use a simple logistic regression approach as the ML classification algorithm to discriminate between the binary states of "normal operation" versus "ransomware payload execution." Other alternative classification algorithms can be used without departing from the scope of the disclosure. In addition, the feature vector may be refined using techniques such as Principal Component Analysis (PCA), Linear Discriminant Analysis (LDA), and others. In some implementations, the sensor-monitoring module 102 can train the prediction models using different methods of encryption such as Electronic Code Book, Cipher-Block Chaining, Cipher FeedBack, XOR encryption, and others.

In some aspects of operations, the sensor-monitoring module 102 receives a training set of hardware sensor data. The hardware sensor data can include data when how the sensors behave on the host computer under normal operating conditions as well data when a covert encryption process is executed. After the sensor training data has been retrieved, the sensor-monitoring module 102 can perform logistic regression to fit the model to the training data. Due to the slight variation between the components of each computer, the resulting ransomware detection model may be different for different devices. Once determined, the sensor-monitoring module 102 can use the model to classify the state of the computing device 100 whenever the hardware sensors are routinely polled. If the model predicts that a suspicious encryption process is executing, the sensor-monitoring module 102 can notify the user and suspend or terminate the suspicious process. In some implementations, the detection algorithm can run as a background process to allow normal usage of the system. A pseudocode version of the detection algorithm is provided below.

```
// load model from binary file
model=load('./model.pkl')
attack_count=0
previous_prediction=0
under_attack=False
// check sensor data and make prediction
while True
   data=monitor.read_sensors( )
   prediction=model.predict(data)
   // determine action based on current and
   // previous data
   if prediction:
      attack_count+=1
   else
      if previous_prediction==0:
         attack_count=0
         under_attack=False
      previous_prediction=data
   // set condition to under attack if positive
   predictions
   // increase above threshold
   if attack_count>threshold:
      under_attack=True
```

FIGS. 2-5 illustrate example results for testing conducted on two different computing devices. Testing was conducted on two computing devices, one running Apple OSX® and the other running Microsoft Windows®. Specifically, the Apple OSX machine was a Macbook Air with a 1.3 GHz Intel® i5 processor and 4 GB of main memory and the Windows® machine was an Intel® i7 processor with 32 GB of main memory.

Training data was collected on both computing devices and the data was used to generate a prediction model for each computing device. The new encryption detection method was tested utilizing a ransomware simulation testing script written in Python. The size of the directory and the method of encryption were selected by randomly picking a number between 1 and 100. All values of 60 and below caused encryption of the small directory, all values from 61 to 90 encrypted the medium directory, and all values from 91 to 100 encrypted the large directory. The particular encryption method used was randomly selected among the four types we implemented in our experiments.

Figure 2:
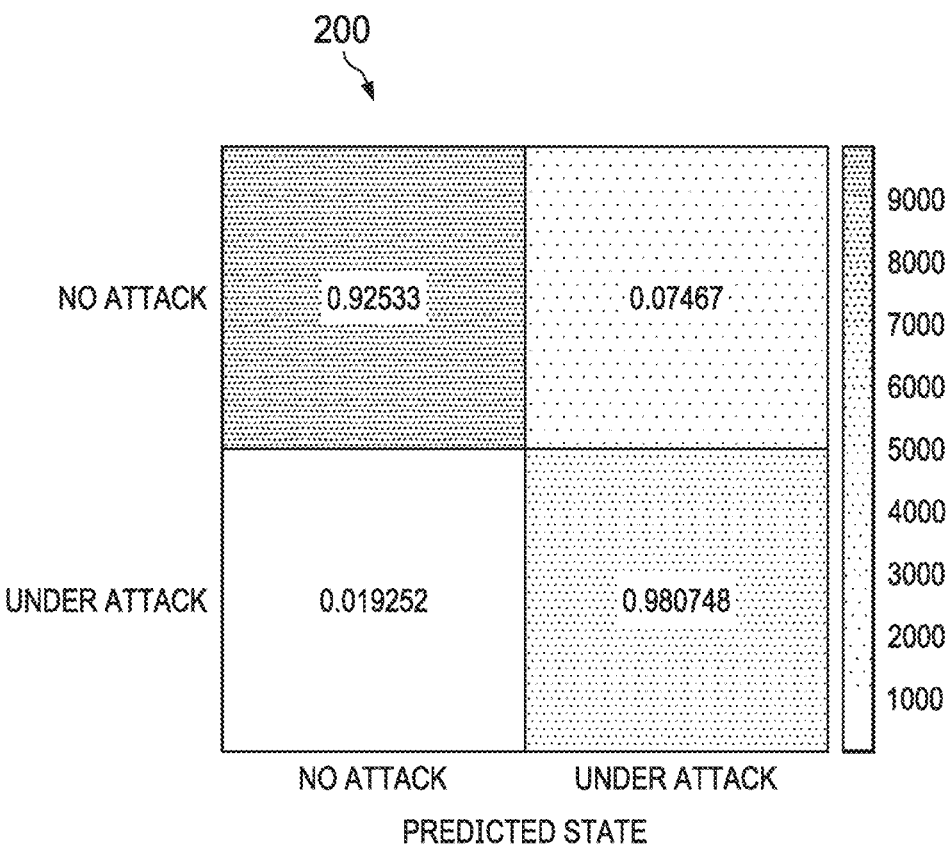
FIG. 2 is an example confusion matrix representing machine state versus ransomware detection model prediction for a Window machine.

After a particular directory has been encrypted, the script waits a random amount of time before performing additional encryption. The amount of time it waits is proportional to the size of the directory it previously encrypted. After encrypting a small directory, a random amount of time between 1 and 60 seconds is selected, a time between 5 and 10 minutes is selected for the medium directory, and a time between 15 and 30 minutes is selected for the large directory. The script also randomly selects a value between 5 and 15 and waits for an hour and a half after encrypting that many gigabytes of data. Randomness and wait times are utilized in order to simulate the attempts made by an adversary to avoid detection of ransomware payload execution. During the encryption process, the script searches for files by recursively starting from a given path. Files that have extensions matching a list of common user file types are read and their data is encrypted. After encryption the data is copied over the existing data in the original file. After testing the Windows® machine for 5 hours 94.2% of sensor polls were accurately predicted as either "under attack" or "no attack". The confusion matrix in FIG. 2 shows the relationship between the predictions made by the model and the actual state of the computing device. During the periods the script was performing encryption 98.1% of polling predictions correctly identified a state of under attack. During the periods, the script was not performing encryption 92.5% of polling predictions correctly identified a state of no attack.

1.9% of the checks that occurred during periods of encryption incorrectly predicted that there was no attack (i.e., a false negative error) while 7.5% of periods with no encryption incorrectly predicted that there was an attack (i.e., a false positive error). The classification method was tuned in a conservative fashion to focus more upon the reduction of false negative errors than the case of false positives as the former error type is assumed to be more critical than the latter.

Figure 3A:
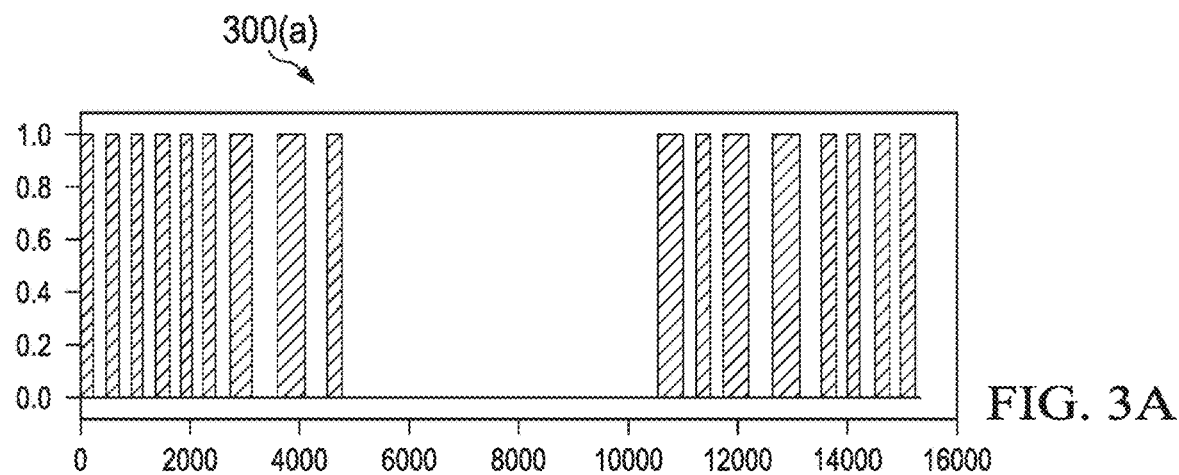
FIG. 3A is a plot of encryption activity versus time for a Window machine.
Figure 3B:
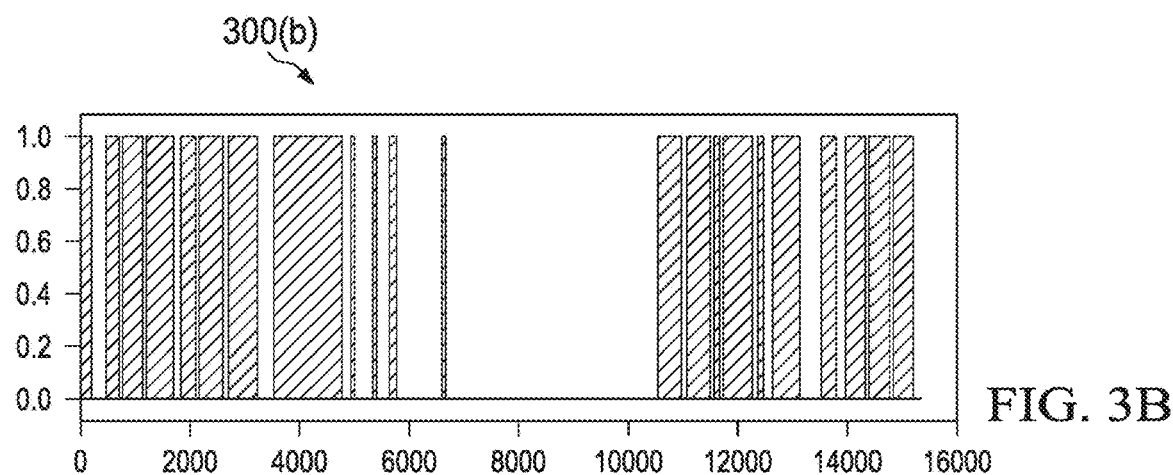
FIG. 3B is a plot of ransomware detection model prediction versus time for a Window machine.
Figure 4:
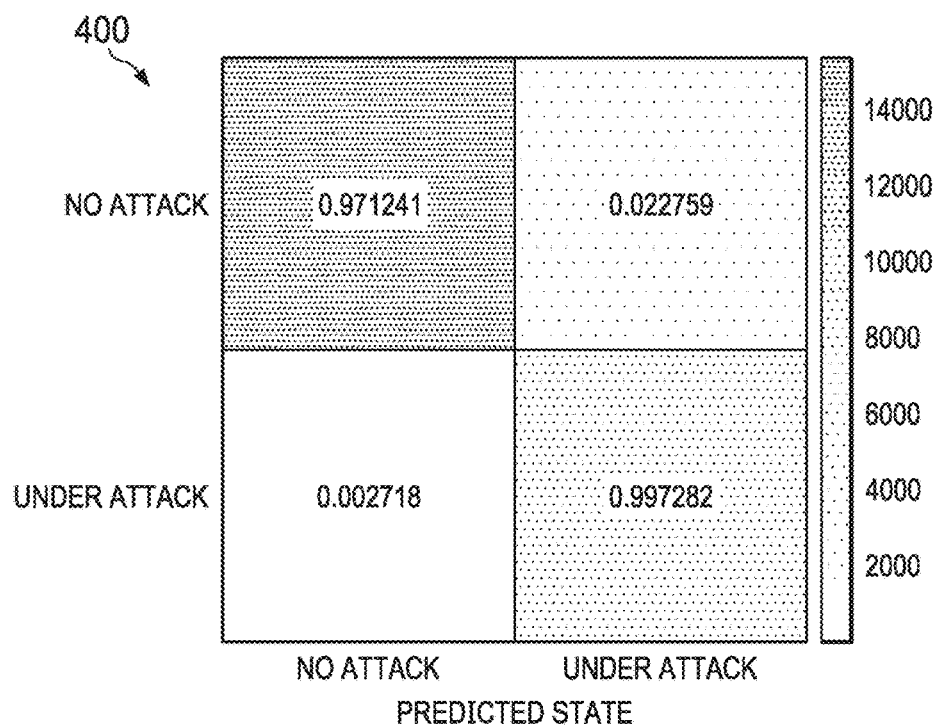
FIG. 4 is a confusion matrix representing actual machine state versus ransomware detection model prediction for an Apple machine.

The overall accuracy of the encryption detection method is illustrated in FIG. 3. The uppermost graph, (a), of the figure represents the actual periods of encryption or "truth data" while the plot on the bottom, (b), represents the actual predicted periods of encryption. These graphs depict the machine state on the vertical axis with zero indicating normal operation and one indicating under attack. The horizontal axes depict time. The Apple computing device was tested by only encrypting the large directory after a random wait period between 30 and 60 minutes over a 6-hour period. This method gives a clear indication of how well the new detection method can detect periods of high volume encryption. The confusion matrix in FIG. 4 shows the relationship between the predictions made by the model and the actual state of the computing device.

Figure 5A:
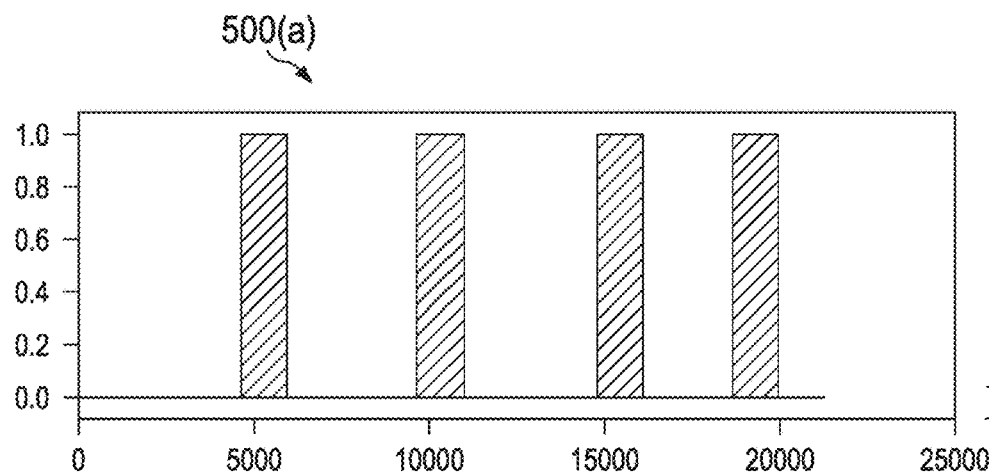
FIG. 5A is a plot of encryption activity versus time for an Apple machine.
Figure 5B:
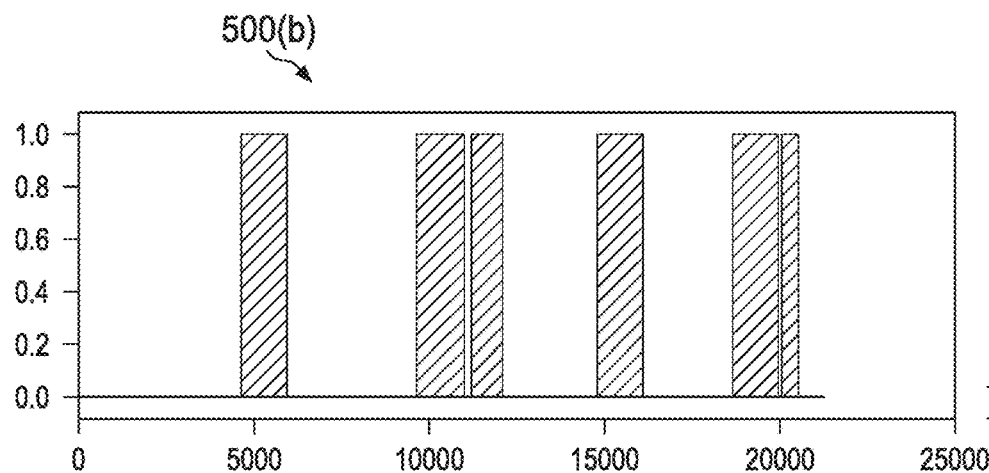
FIG. 5B is a plot of ransomware detection model prediction versus time for an Apple machine.

After testing the Apple machine, 98.2% of the sensor polls resulted in accurate predictions. During the periods the script was actually performing an encryption operation, 99.7% of the polling predictions correctly identified a state of "under attack." During the periods the script was not performing encryption, 97.7% of polling predictions correctly identified a state of "no attack." A false negative rate of 0.27% of the checks that occurred during periods of encryption incorrectly predicted that there was no attack while a false positive error rate of 2.3% of observations with no encryption incorrectly predicted that there was an attack. FIG. 5 shows the periods of actual encryption in the uppermost portion, (a), and periods of predicted encryption in the lower portion, (b). As in FIG. 3, the vertical axes depict machine state and the horizontal axes depict time.

Upon further analysis of the results, most periods of false positive predictions occurred directly after a correct attack prediction. This can be observed in FIG. 5 which contains false positive periods after the second and fourth encryption periods. Implementing additional testing and filtering techniques that more closely scrutinize predictions being made for a short period directly following a positive prediction period can result in increased overall accuracy. In some implementations, temporal or history data regarding past recent predictions may be included in the analysis.

Legitimate encryption can be accounted using whitelisting or other methods that notify the detection process that legitimate encryption operations are in process. For example, system registry data can be used to label processes that employ legitimate encryption and the ransomware detection process can be augmented to verify if a detection is the result of a legitimate process or not before a state of "ransomware payload execution" is declared.

In some implementations, experimental ransomware detection algorithm can use a simple polling or sampling method wherein the operational phase of the detection method would periodically query the sensors to obtain readings. This approach suffers from potential aliasing problems, particularly if the malware payload were to be implemented in short bursts or use some other form of intelligence about the state of the victim system before encryption is executed. In some implementations, the schedule sensor queries can be an event-based technique. In these instances, error rates can be reduced while also reducing the average computational overhead since ransomware payload execution is a relatively rare event.

The method can be applicable to both previously known as well as zero-day instances of ransomware that employ encryption in the payload. The detection method results in very low, if any, data loss since encryption detection can occur very early in the timespan of the malicious encryption activity. For example, the data loss may be less than 5%, 1%, or 0.1%. The method is based upon monitoring on-board, hardware sensor data streams rather than characteristics of the targeted data. The new technique may not include modification to hosting computer systems because most computing devices include pre-existing physical sensors, supporting circuitry, and access to the sensor readings.

Figure 6:
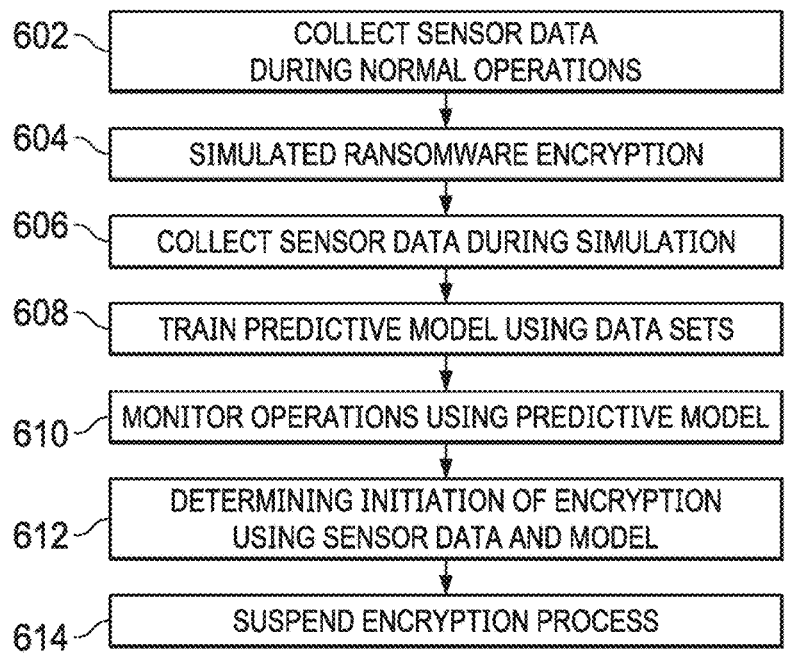
FIG. 6 is a flowchart illustrating an example method for detecting ransomware.

FIG. 6 is a flow diagram illustrating an example method 600 of analyzing a partial software program, according to an implementation. For clarity of presentation, the description that follows generally describes method 600 in the context of the other figures in this description. However, it will be understood that method 600 may be performed, for example, by any suitable system, environment, software, and hardware, or a combination of systems, environments, software, and hardware, as appropriate. For example, method 200 can be performed by the example computing system 100 illustrated in FIG. 1. In some implementations, various steps of method 600 can be run in parallel, in combination, in loops, or in any order.

The method 600 begins at step 602 where sensor data is collected during normal operations. For example, the sensor-monitoring module 102 can retrieve sensor data during normal operations. Ransomware encryption is simulated at step 604, and the sensor data is retrieved during that simulation at step 606. Next, at step 608, a predictive model is trained using both data sets. Once trained, sensor data of the computing device is monitored, at step 610, using the trained predictive model and sensor data to detect ransomware encryption. At step 612, initiation of ransomware encryption is detected using the trained predictive model and sensor data. At step 614, the encryption is at least suspended.

A number of embodiments of the invention have been described. Nevertheless, it will be understood that various modifications may be made without departing from the spirit and scope of the invention. Accordingly, other embodiments are within the scope of the following claims.

What is claimed is:

1. A non-transitory computer readable medium storing instructions to cause a processor of a computing device to perform operations comprising:
    a) simulating execution of a malware in the computing device;
    b) while the simulation of malware is executed by the computing device, obtaining sensor data from multiple sensors in the computing device, wherein the multiple sensors comprise different types of sensors to monitor an operating condition of internal hardware components of the computing device, the multiple sensors residing in a side channel separate from the processor of the computing device, and the obtained sensor data reflective of the operating condition of the internal hardware components while the simulation of malware is executed by the computing device, wherein the obtained sensor data obtained while the simulation of malware is executed by the computing device is different from sensor data obtained while the computing device is not executing the simulation of malware;
    c) training a predictive model to detect malware using the obtained sensor data to detect execution of a malware target process by the computing device;
    d) after training the predictive model, obtaining sensor data from multiple sensors in the computing device during a normal operation of the computing device;
    e) analyzing the obtained sensor data retrieved during the normal operation based on the predictive model;
    f) determining execution of malware in response to analyzing the obtained sensor data retrieved during the normal operation based on the predictive model; and
    g) in response to the determination, terminating the malware.

2. The non-transitory computer readable medium of claim 1, wherein the operations do not comprise behavioral analysis to determine the execution of malware.

3. The non-transitory computer readable medium of claim 1, wherein the operations do not comprise behavioral analysis to determine the execution of the malicious target process.

4. The non-transitory computer readable medium of claim 1, wherein the malware comprises ransomware, data stealing malware, spyware, adware, a trojan, a worm, a rootkit, a keylogger, a screen scraper, a bot, or a combination thereof.

5. The non-transitory computer readable medium of claim 1, wherein the predictive model comprises a feature vector determined using machine learning.

6. The non-transitory computer readable medium of claim 5, wherein the feature vector is determined using a single machine learning model.

7. The non-transitory computer readable medium of claim 5, wherein the feature vector is determined using a collection of machine learning models.

8. The non-transitory computer readable medium of claim 1, wherein the multiple sensors comprise a sensor for at least one of a main memory power, voltage, current, or temperature.

9. The non-transitory computer readable medium of claim 1, wherein the determination comprises a binary prediction.

10. The non-transitory computer readable medium of claim 1, wherein the malicious target process comprises a file input/output (PO) process.

11. The non-transitory computer readable medium of claim 1, wherein the malicious target process comprises a network input/output (I/O) process.

12. The non-transitory computer readable medium of claim 1, wherein the malicious target process comprises a virtualization process.

13. The non-transitory computer readable medium of claim 1, wherein the malicious target process comprises data exfiltration.

14. A method comprising:
a) simulating execution of a malware in a computing device;
b) while the simulation of malware is executed by the computing device, obtaining sensor data from multiple sensors in the computing device, wherein the multiple sensors comprise different types of sensors to monitor an operating condition of internal hardware components of the computing device, the multiple sensors residing in a side channel separate from the processor of the computing device, and the obtained sensor data reflective of the operating condition of the internal hardware components while the simulation of malware is executed by the computing device, wherein the obtained sensor data obtained while the simulation of malware is executed by the computing device is different from sensor data obtained while the computing device is not executing the simulation of malware;
c) training a predictive model to detect malware using the obtained sensor data to detect execution of a malicious target process by the computing device;
d) after training the predictive model, obtaining sensor data from multiple sensors in the computing device during a normal operation of the computing device;
e) analyzing the obtained sensor data retrieved during the normal operation based on the predictive model;
f) determining execution of malware in response to analyzing the obtained sensor data retrieved during the normal operation based on the predictive model; and
g) in response to the determination, terminating the malware.

15. The method of claim 14, wherein the method does not comprise conducting behavioral analysis to determine the execution of malware.

16. The method of claim 14, wherein the method does not comprise conducting behavioral analysis to determine the execution of the malicious target process.

17. The method of claim 14, wherein the malware comprises ransomware, data stealing malware, spyware, adware, a trojan, a worm, a rootkit, a keylogger, a screen scraper, a bot, or a combination thereof.

18. The method of claim 14, wherein the predictive model comprises a feature vector determined using machine learning.

19. The method of claim 18, wherein the feature vector is determined using a single machine learning model.

20. The method of claim 18, wherein the feature vector is determined using a collection of machine learning models.

21. The method of claim 14, wherein the multiple sensors comprise a sensor for at least one of a main memory power, voltage, current, or temperature.

22. The method of claim 14, wherein the determination comprises a binary prediction.

23. The method of claim 14, wherein the malicious target process comprises a file input/output (I/O) process.

24. The method of claim 14, wherein the malicious target process comprises a network input/output (I/O) process.

25. The method of claim 14, wherein the malicious target process comprises a virtualization process.

26. The method of claim 14, wherein the malicious target process comprises data exfiltration.

27. An integrated circuit configured to perform operations comprising:
a) simulating execution of a malware in a computing device;
b) while the simulation of malware is executed by the computing device, obtaining sensor data from multiple sensors in the computing device, wherein the multiple sensors comprise different types of sensors to monitor an operating condition of internal hardware components of the computing device, the multiple sensors residing in a side channel separate from the processor of the computing device, and the obtained sensor data reflective of the operating condition of the internal hardware components while the simulation of malware is executed by the computing device, wherein the obtained sensor data obtained while the simulation of malware is executed by the computing device is different from sensor data obtained while the computing device is not executing the simulation of malware;
c) training a predictive model to detect malware using the obtained sensor data to detect execution of a malware target process by the computing device;
d) after training the predictive model, obtaining sensor data from multiple sensors in the computing device during a normal operation of the computing device;
e) analyzing the obtained sensor data retrieved during the normal operation based on the predictive model;
f) determining execution of malware in response to analyzing the obtained sensor data retrieved during the normal operation based on the predictive model; and
g) in response to the determination, terminating the malware.

28. The integrated circuit of claim 27, wherein the operations do not comprise behavioral analysis to determine the execution of malware.

29. The integrated circuit of claim 27, wherein the operations do not comprise behavioral analysis to determine the execution of the malicious target process.

30. The integrated circuit of claim 27, wherein the malware comprises ransomware, data stealing malware, spyware, adware, a trojan, a worm, a rootkit, a keylogger, a screen scraper, a bot, or a combination thereof.

31. The integrated circuit of claim 27, wherein the predictive model comprises a feature vector determined using machine learning.

32. The integrated circuit of claim 31, wherein the feature vector is determined using a single machine learning model.

33. The integrated circuit of claim 31, wherein the feature vector is determined using a collection of machine learning models.

34. The integrated circuit of claim 27, wherein the multiple sensors comprise a sensor for at least one of a main memory power, voltage, current, or temperature.

35. The integrated circuit of claim 27, wherein the determination comprises a binary prediction.

36. The integrated circuit of claim 27, wherein the malicious target process comprises a file input/output (I/O) process.

37. The integrated circuit of claim 27, wherein the malicious target process comprises a network input/output (I/O) process.

38. The integrated circuit of claim 27, wherein the malicious target process comprises a virtualization process.

39. The integrated circuit of claim 27, wherein the malicious target process comprises data exfiltration.

40. A computing device comprising circuitry configured to perform operations comprising:
   a) simulating execution of a malware in the computing device;
   b) while the simulation of malware is executed by the computing device, obtaining sensor data from multiple sensors in the computing device, wherein the multiple sensors comprise different types of sensors to monitor an operating condition of internal hardware components of the computing device, the multiple sensors residing in a side channel separate from the processor of the computing device, and the obtained sensor data reflective of the operating condition of the internal hardware components while the simulation of malware is executed by the computing device, wherein the obtained sensor data obtained while the simulation of malware is executed by the computing device is different from sensor data obtained while the computing device is not executing the simulation of malware;
   c) training a predictive model to detect malware using the obtained sensor data to detect execution of a malware target process by the computing device;
   d) after training the predictive model, obtaining sensor data from multiple sensors in the computing device during a normal operation of the computing device;
   e) analyzing the obtained sensor data retrieved during the normal operation based on the predictive model;
   f) determining execution of malware in response to analyzing the obtained sensor data retrieved during the normal operation based on the predictive model; and
   g) in response to the determination, terminating the malware.

41. The computing device of claim 40, wherein the operations do not comprise behavioral analysis to determine the execution of malware.

42. The computing device of claim 40, wherein the operations do not comprise behavioral analysis to determine the execution of the malicious target process.

43. The computing device of claim 40, wherein the malware comprises ransomware, data stealing malware, spyware, adware, a trojan, a worm, a rootkit, a keylogger, a screen scraper, a bot, or a combination thereof.

44. The computing device of claim 40, wherein the predictive model comprises a feature vector determined using machine learning.

45. The computing device of claim 44, wherein the feature vector is determined using a single machine learning model.

46. The computing device of claim 44, wherein the feature vector is determined using a collection of machine learning models.

47. The computing device of claim 40, wherein the multiple sensors comprise a sensor for at least one of a main memory power, voltage, current, or temperature.

48. The computing device of claim 40, wherein the determination comprises a binary prediction.

49. The computing device of claim 40, wherein the malicious target process comprises a file input/output (I/O) process.

50. The computing device of claim 40, wherein the malicious target process comprises a network input/output (I/O) process.

51. The computing device of claim 40, wherein the malicious target process comprises a virtualization process.

52. The computing device of claim 40, wherein the malicious target process comprises data exfiltration.

* * * * *